US012801546B2

(12) United States Patent
Kang et al.

(10) Patent No.: US 12,801,546 B2
(45) Date of Patent: Nov. 17, 2026

(54) NETWORKING SWITCH AND METHOD WITH DIRECT MEMORY ACCESS BASED LINK CONTROL

(71) Applicant: SAMSUNG ELECTRONICS CO., LTD., Suwon-si (KR)

(72) Inventors: Mincheol Kang, Suwon-si (KR); Yong In Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 18/782,497

(22) Filed: Jul. 24, 2024

(65) Prior Publication Data

US 2025/0199973 A1 Jun. 19, 2025

(30) Foreign Application Priority Data

Dec. 14, 2023 (KR) ........................ 10-2023-0182235

(51) Int. Cl.
*G06F 13/00* (2006.01)
*G06F 13/28* (2006.01)

(52) U.S. Cl.
CPC .................................... *G06F 13/28* (2013.01)

(58) Field of Classification Search
CPC ........................................................ G06F 13/28
See application file for complete search history.

(56) References Cited

U.S. PATENT DOCUMENTS

| | | | | |
|---|---|---|---|---|
| 8,949,502 | B2 | 2/2015 | McKnight et al. | |
| 9,372,526 | B2 | 6/2016 | Bodas et al. | |
| 10,528,494 | B2 * | 1/2020 | McBride | G06F 13/28 |
| 11,281,602 | B1 | 3/2022 | Iyer et al. | |
| 11,341,108 | B2 | 5/2022 | Butcher | |
| 11,422,963 | B2 | 8/2022 | Iyer et al. | |
| 12,306,778 | B2 * | 5/2025 | Iyer | G06F 13/28 |
| 2007/0294444 | A1 * | 12/2007 | Panesar | G06F 13/4221 710/104 |
| 2023/0409511 | A1 * | 12/2023 | Guim Bernat | G06F 13/28 |

FOREIGN PATENT DOCUMENTS

| | | | |
|---|---|---|---|
| CN | 111651380 | A | 9/2020 |
| CN | 112131175 | A | 12/2020 |

* cited by examiner

*Primary Examiner* — Tammara R Peyton
(74) *Attorney, Agent, or Firm* — NSIP Law

(57) ABSTRACT

A networking switch, including: a descriptor decoder configured to obtain descriptor data by decoding a direct memory access (DMA) descriptor packet encapsulated in a packet transferred, the packet from a host device; and a link power controller configured to adjust, based on the descriptor data, a power state of a link to be passed through in a bus interface connected to the networking switch.

20 Claims, 14 Drawing Sheets

500

510

511

| Memory write | 0 | 1 | 2 | 3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| Byte 0 | Fmt 0 1 1 / Type 0 0 0 0 0 | T9 / TC / T8 / A2 / R / TH | TD / EP / Attr / AT | Length |
| Byte 4 | Requester ID | | Tag | Last BE / First BE |
| Byte 8 | Address [63:32] | | | |
| Byte 12 | Address [31:2] | | | PH |

530

| Comple. /w data | 0 | 1 | 2 | 3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| Byte 0 | Fmt 0 1 0 / Type 0 1 0 1 0 | T9 / TC / T8 / A2 / R / TH | TD / EP / Attr / AT | Length |
| Byte 4 | Completer ID | | Cpl.status / BM / Byte count | |
| Byte 8 | Requester ID | | Tag | R / Lower address |

531 533

550

VendorPrefixE0 (Vendor defined End-End TLP prefix

| Prefix | 0 | 1 | 2 | 3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| Byte 0 | Fmt 1 0 0 / Type 1 1 1 1 0 | Rsvd. | | |

FIG. 5A

| | L0 | L1 | L2 | L3 | L4 | L5 | L6 | L7 | L8 | L9 | L10 | L11 | L12 | L13 | L14 | L15 |
|---|---|---|---|---|---|---|---|---|---|---|---|---|---|---|---|---|
| Sync Hdr | 0<br>1 | 0<br>1 | 0<br>1 | 0<br>1 | 0<br>1 | 0<br>1 | 0<br>1 | 0<br>1 | 0<br>1 | 0<br>1 | 0<br>1 | 0<br>1 | 0<br>1 | 0<br>1 | 0<br>1 | 0<br>1 |
| Symbol 0 | ProtID [7:0] =CXL.io | ProtID [15:8] =CXL.io | PCIe STP Token | | | | PCIe TLP Header DW0 | | | | PCIe TLP Header DW1 | | | | PCIe TLP Header DW2 [15:0] | |
| Symbol 1 | PCIe TLP Header DW2 [31:16] | | PCIe TLP Data payload DW0 | | | | PCIe TLP Data payload DW1 | | | | PCIe TLP Data payload DW2 | | | | PCIe TLP L CRC | |
| Symbol 2 | PCIe TLP L CRC | | PCIe SDP Token | | PCIe DLLP Payload | | | | PCIe DLLP CRC | | PCIe IDL | PCIe IDL | PCIe IDL | PCIe IDL | PCIe IDL | PCIe IDL |
| Symbol 3 | PCIe IDL | PCIe IDL | PCIe STP Token | | | | PCIe TLP Header DW0 | | | | PCIe TLP Header DW1 | | | | PCIe TLP Header DW2 [15:0] | |
| Symbol 4 | PCIe TLP Header DW2 [31:16] | | Reserved | Reserved | ProtID [7:0] =CXL.io | ProtID [15:8] =CXL.io | PCIe TLP Data Payload DW0 | | | | PCIe TLP Data Payload DW1 | | | | PCIe TLP Data Payload DW2 [15:0] | |

FIG. 5B

| Operation group | Type | Required for SDXI function? |
|---|---|---|
| (Reserved) | 0×000 | Reserved |
| DMA Base operation group (DmaBaseGrp) | 0×001 | Mandatory, not-enumerable |
| Administrative operation group (AdminGrp) | 0×002 | Mandatory, not-enumerable; supported in context 0 only. |

630

| | | | |
|---|---|---|---|
| DMA Base operation group (DmaBaseGrp) | 0×001 | 0×01 | DMAB_NOP |
| | | 0×02 | DMAB_WRT_IMM |
| | | 0×03 | DMAB_COPY |
| | | 0×04 | DMAB_REPCOPY |

DSC_DMA_REPCOPY Descriptor format 650

NETWORKING SWITCH AND METHOD WITH DIRECT MEMORY ACCESS BASED LINK CONTROL

CROSS-REFERENCE TO RELATED APPLICATIONS

This application claims the benefit under 35 USC § 119(a) of Korean Patent Application No. 10-2023-0182235, filed on Dec. 14, 2023, in the Korean Intellectual Property Office, the entire disclosure of which is incorporated herein by reference for all purposes.

BACKGROUND

1. Field

The following description relates to a networking switch, a method of operating a networking switch, and a computer system including a networking switch.

2. Description of Related Art

Peripheral Component Interconnect Express (PCIe) is a high-speed serial computer expansion bus standard, and may be mainly used to connect a host device (e.g., a central processing unit (CPU)) to various input/output (I/O) devices (e.g., a storage device, graphics processing unit (GPU), network interface controller (NIC), a memory pool, and the like). A PCIe system may extend its bandwidth by increasing the number of lanes. For example, in various servers such as a data center or supercomputer, GPUs may be connected to build a high performance computing system, or, multiple storages may be connected to obtain higher storage capacity.

A PCIe switch may be used to connect I/O devices. The PCIe switch may be configured with multiple lanes, and the number of lanes may keep increasing according to a recent computing environment which may require increasingly more connections and increasingly higher bandwidth. The bandwidth may be increased with successive generations of the PCIe standard and the number of lanes in a PCIe switch may increase, however this natural progression may be insufficient for new and emerging applications and more PCIe power may be beneficial.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a networking switch includes: a descriptor decoder configured to obtain descriptor data by decoding a direct memory access (DMA) descriptor packet encapsulated in a packet transferred, the packet from a host device; and a link power controller configured to adjust, based on the descriptor data, a power state of a link to be passed through in a bus interface connected to the networking switch.

The packet may be a transaction layer packet (TLP), and the descriptor decoder may be configured to decode the DMA descriptor packet according to a determination that the TLP includes the DMA descriptor packet.

The descriptor decoder may be configured to determine that the TLP includes the DMA descriptor packet by decoding a reserved area including either a reserved bit included in a header of the TLP or a prefix of the TLP based on a smart data accelerator interface (SDXI) protocol, and the reserved area may be defined by the host device.

The descriptor decoder may be configured to, based on the determination that the TLP includes the DMA descriptor packet, decode the DMA descriptor packet as obtained from a data payload of the DMA descriptor packet.

The descriptor decoder may be configured to add information used to adjust the power state of the link to be passed through by using a reserved area as defined by a standard descriptor format of the DMA descriptor packet.

The descriptor data may include an amount of data to be transferred according to the DMA descriptor packet, a source address of the data, and/or a destination address of the data.

The link power controller may be configured to adjust the power state of the link to be passed through based on an operation code of the DMA descriptor packet, a size of data transferred through the DMA descriptor packet, a state of a source of the data transferred through the DMA descriptor packet, and/or a state of a destination of the data.

The link power controller may be configured to determine whether to maintain the power state of the link to be passed through in an active state or to switch the power state to a low power state, based on whether a DMA operation is to be performed for a memory device, an amount of data to transferred by the DMA operation, a current power state of the link to be passed through, a power state to be changed of the link to be passed through, or latency for switching the power state of the link to be passed through.

The link power controller may be configured to, in response to the amount of data being smaller than a predetermined reference size, switch the power state of the link to be passed through to the low power state independently of whether the packet includes the DMA descriptor packet.

The link power controller may be configured to transfer the DMA descriptor packet, which has an indication of an adjusted the power state of the link to be passed through, to a DMA engine.

The link power controller may be configured to, in response to the DMA operation for the memory device being performed as the DMA descriptor packet, which has the adjusted power state of the link to be passed through, is transferred to the DMA engine, and an input/output (I/O) device connected to the networking switch being not used for a predetermined period of time, switch the power state of the link connected to the I/O device to the low power state.

The DMA engine may be included in the I/O device or in the networking switch.

The networking switch may be configured to, based on the networking switch including the DMA engine and based on recognizing access of the host device to a DMA control register in the networking switch, receive the descriptor data from the host device, and adjust the power state of the link to be passed through to the active state or the low power state by interpreting the descriptor data.

Based on a number of I/O devices connected to the networking switch being more than one, and the I/O devices performing a DMA operation for a memory device, the host device is configured to maintain the link to be passed through in an active state in a bus interface of a target I/O device to perform the DMA operation among the plurality of I/O devices, and transfer the DMA descriptor packet through the link in the active state.

The link power controller may be configured to, based on the number of host devices being more than one and a first packet including the DMA descriptor packet and a second packet not including the DMA descriptor packet being transferred from the plurality of host devices: switch, to an active state, a link to be passed through by the first packet; and switch, to a low power state, a link to be passed through by the second packet.

In another general aspect, a computer system includes: a host device configured to, in response to a DMA request by an application, generate and transfer a packet encapsulating a direct memory access (DMA) descriptor packet corresponding to a memory device; a networking switch configured to adjust a power state of a link to be passed through in a bus interface, based on descriptor data obtained by decoding the DMA descriptor packet encapsulated in the packet; and an input/output (I/O) device configured to perform a DMA operation for the memory device through the link with the adjusted power state.

A DMA engine configured to perform the DMA operation may be included in the I/O device or in the networking switch, and whether the networking switch adjusts the power state of the link to be passed through depends on whether the DMA engine performs the DMA operation for the memory device.

In another general aspect, a method of operating a networking switch includes: receiving a packet from a host device; obtaining descriptor data by decoding a direct memory access (DMA) descriptor packet encapsulated in the packet; and based on the descriptor data, adjusting a power state of a link to be passed through in a bus interface connected to the networking switch.

The power state of the link to be passed through may be adjusted based on whether a DMA operation is to be performed for a memory device, an amount of data to be moved by performing the DMA operation, a current power state of the link to be passed through, a power state to be changed of the link to be passed through, and/or latency for switching the power state of the link to be passed through.

The adjusting of the power state of the link to be passed through may include, based on the amount of data to be moved by performing the DMA operation for the memory device being smaller than a predetermined reference size, adjusting the power state of the link to be passed through to a low power state independently of whether the packet includes the DMA descriptor packet.

Other features and aspects will be apparent from the following detailed description, the drawings, and the claims.

BRIEF DESCRIPTION OF THE DRAWINGS

FIG. 5A illustrates example structure of a packet including information about a DMA descriptor generated by a packet generator, according to one or more embodiments.

FIG. 5B illustrates an example of a format of a peripheral component interconnect express (PCIe) packet in CXL.io, according to one or more embodiments.

Figure 1:
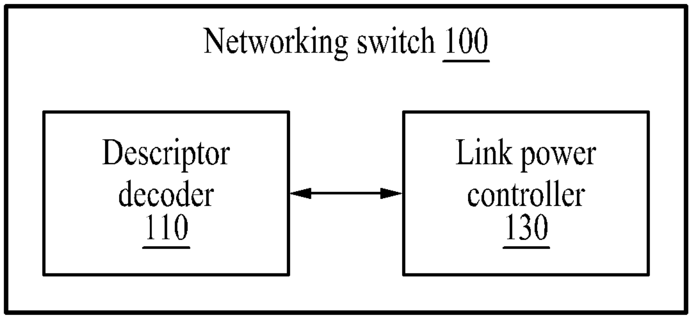
FIG. 1 illustrates an example networking switch, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles “a,” “an,” and “the” are intended to include the plural forms as well, unless the context clearly indicates otherwise. As used herein, the term “and/or” includes any one and any combination of any two or more of the associated listed items. As non-limiting examples, terms “comprise” or “comprises,” “include” or “includes,” and “have” or “has” specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example networking switch, according to one or more embodiments. Referring to FIG. 1, a networking switch 100 according to an example includes a descriptor decoder 110 and a link power controller 130 (the link power controller 130 is not a part of a link device but rather is a component for controlling power consumption of link devices, as described below).

Figure 2:
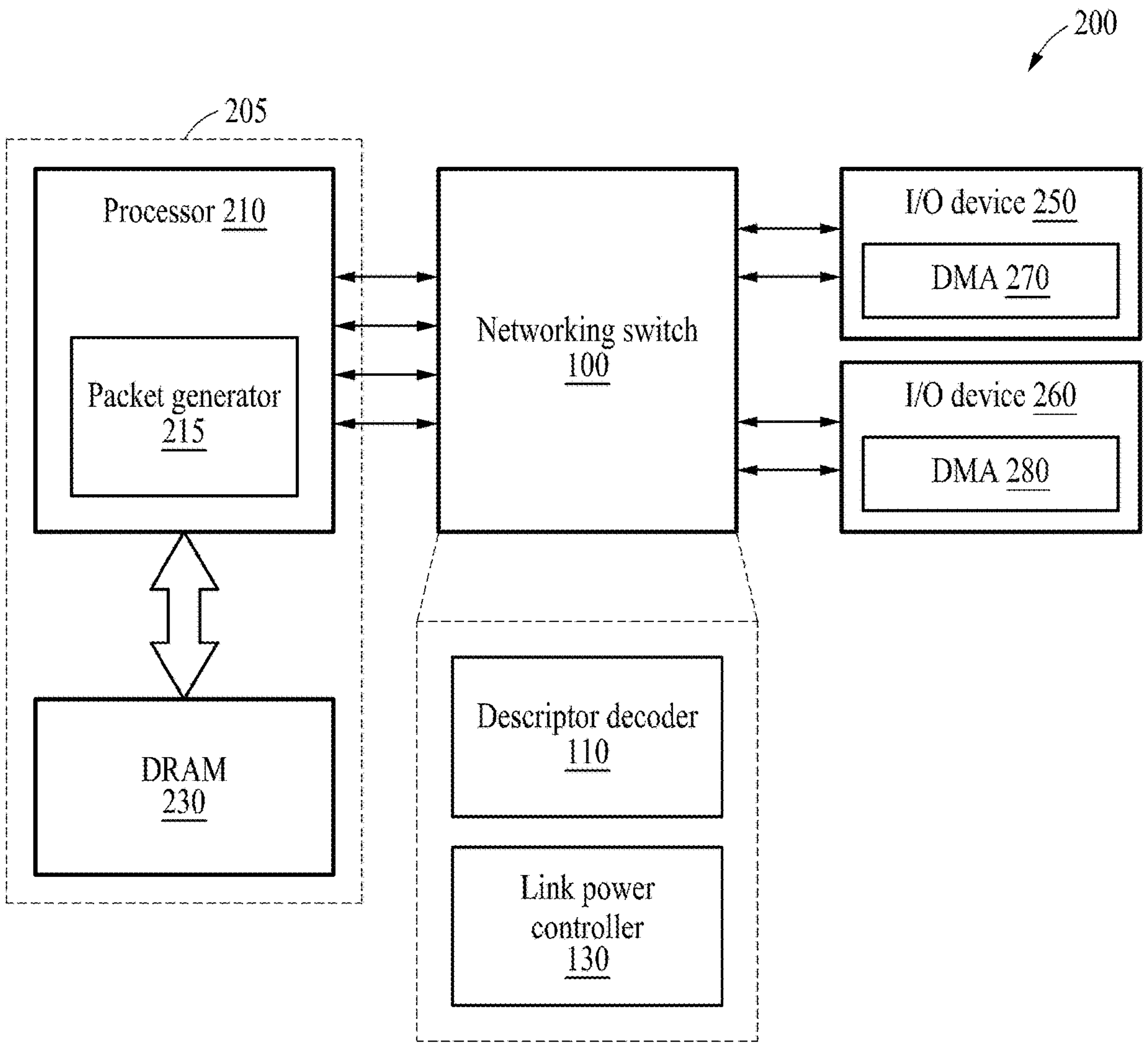
FIG. 2 illustrates an example computer system including a networking switch, according to one or more embodiments.

The descriptor decoder 110 obtains descriptor data by decoding a direct memory access (DMA) descriptor packet included in a packet transferred from the host device (e.g., a host device 205 of FIG. 2). The descriptor data may include a size of data to be transferred according to the DMA descriptor packet and a source or destination address of the data that is to be transferred through a source of the DMA descriptor. Here, the source address may be referred to as a "start address" and the destination address may be referred to as an "end address". A packet transferred from the host device may, for example, be a transaction layer packet (hereinafter, "TLP") transferred through a transaction layer, however, is not necessarily limited thereto. In PCIe, the transaction layer is between the data link layer and the device/software/application layer. The packet may be generated, for example, by a packet generator (e.g., a packet generator 215 of FIG. 2) included in the host device. The packet generator may generate a TLP that includes a DMA descriptor payload. The DMA descriptor packet is a packet including a DMA descriptor, and may also be referred to as a "DMA packet". A DMA descriptor refers to an individual packet within a TL packet.

The DMA descriptor may indicate a data size of data to be transferred and a source address and a destination address between which the data is to be transferred by a corresponding DMA operation; the DMA descriptor may have a format or structure of a data structure also referred to as a descriptor. For example, when an application is to store or access information, it may store information necessary for storing/accessing in the DMA descriptor and may give a command to a DMA engine. An input/output (I/O) device may interpret the DMA descriptor transferred in a TLP, and the DMA engine (e.g., a PCIe DMA engine) may perform a DMA operation (e.g., a PCIe DMA operation) based on the interpreted information.

DMA is a known technology for data transfer between hardware components without the intervention of a host device such as a processor (i.e., without the data passing through the host device). For a DMA operation, the host device may generate a DMA descriptor packet including information for enabling performance of the data transfer. Such information in the DMA descriptor packet may include, for example, a buffer address necessary for the data transfer, a size (e.g., a total amount of data to be transferred) of data to be transferred, a transfer direction, and the like. A DMA engine or DMA controller which has received the DMA descriptor packet issued from the host device may perform the data transfer according to the aforementioned information included in the DMA descriptor packet.

The DMA may be used to transfer data between an I/O device and a memory. The I/O device may request the DMA engine to transfer data, and the DMA engine may perform the data transfer based on the information included in the DMA descriptor packet. This may improve system performance, compared to host-based transfer, because the host device does not have to process the data transfer between the I/O device and the memory. As described above, the DMA engine may be used to transfer data without the intervention of a host processor (e.g., a host central processing unit (CPU)). The data may be transferred between an address of a readable source and an address of a writable destination within an address space of the processor (the information in the DMA descriptor packet may generally reference that address space).

A DMA operation may be started, for example, by a peripheral device or processor that sets a DMA request signal. The DMA engine may be connected to a bus system (e.g., a PCIe bus) as a master and may access all slave memory areas; the DMA engine may control access to the slave memory areas. When the DMA operation is complete, the DMA engine may signal the completion to the processor by triggering a processor interrupt. While the DMA engine is transferring the data, the processor may freely perform other tasks or switch to a power saving mode to save power.

The descriptor decoder 110, executing within the networking switch 100 for example, may parse and decode a DMA descriptor packet to confirm/obtain information about a source or destination address and a size of data to be transferred to the source address or destination address.

When the descriptor decoder 110 receives a TLP, the descriptor decoder 110 may decode the DMA descriptor packet to determine whether the TLP includes a DMA descriptor packet. Specifically, for example, when the networking switch 100 implements the Smart Data Accelerator Interface (SDXI) protocol, the descriptor decoder 110 may determine whether the TLP includes the DMA descriptor packet by decoding a reserved area defined by the SDXI protocol; the reserved area may be, for example, a reserved bit defined for TLP headers or may be a prefix field of the TLP. The reserved bit and the prefix are described with reference to FIG. 5A below. The reserved area may be defined by the host device. The descriptor decoder 110 may add information to signal adjustment of a power state of a link to be passed-through, and that power information may be added to the reserved area (or the like) of a packet; the reserved area may be in a part of a descriptor format (e.g., a field) of a DMA descriptor packet (the power information may be in the TL packet). When a TLP includes a DMA descriptor, the descriptor decoder 110 may decode the DMA descriptor according to a DMA descriptor formation-definition (the DMA descriptor may be in the data payload portion of the TLP, and the format-definition may be part of a PCIe standard or extension thereof).

The link power controller 130 (or part of the networking switch 100 with equivalent functionality) may signal adjustment of a power state of whichever link(s) (to be performed by the link) may be used to route the corresponding DMA data, and the signaling may be performed according to the size of the data to be transferred, which may be obtained through the descriptor decoder 110. For example, when the size of the data that is the subject of the DMA operation is smaller than a threshold or reference size, the link power controller 130 may control the power state of the link through which the DMA data is to be passed to a low-power state. The reference size may be predefined or may be determined dynamically. The power-signal information may be included in a TLP regardless of whether the TLP includes a DMA descriptor.

The link power controller 130 adjusts a power state of a link (which is to be passed through) in a bus interface connected to the networking switch 100 and the adjusting may be based on descriptor data obtained by the descriptor decoder 110. Here, the bus interface may be a peripheral component interconnect express (PCIe) bus interface or a compute express link (CXL) bus interface. The PCIe bus interface may include, for example, set space access, base address (BAR) mapping memory access used in a register and mail box, message signaled interrupts (MSI)/MSI-X, advanced error reporting (AER), data object exchange (DOE) mail box, integrity and data encryption (IDE), and various PCIe defined interfaces.

In further regard to the link power controller 30, assuming a bus interface such as PCIe, the setting of the bus (e.g., configuration space) may be done through the PCIe link status register and link control register. In addition, the bus is composed of ports inside the switch. The link power controller can know the status of the link by reading the value of the link status register of the bus interface (port), and can control the power of the link by writing a specific value to the link control register. Since the link power control is inside the switch, the status of the link (bus interface) connected to it can be known through the status register of the port. The link power can be controlled by setting the value of the link control register of the port connected to the link without having to send a specific power setting to the link.

The link power controller 130 may control adjustment of the power state of a link to be passed through based an operation code of the DMA descriptor, a size of data to be transferred according to the DMA descriptor, a state of a source of the data to be transferred, and/or a state of a destination of the data.

The link power controller 130 may determine whether to maintain the power state of the link to be passed through in an active state or to switch the power state to a low power state. This determination may be based on the DMA operation is for a memory device, a size of data to transferred by the DMA operation, a current power state of the link to be passed through, a power state to be changed of the link to be passed through, and/or latency for switching of the power state of the link (i.e., latency of the switching path) to be passed through. For example, when the size of the data to be transferred by the DMA operation is smaller than a predetermined reference size, the link power controller 130 may switch the power state of the link to be passed through to a low power state independently of whether the packet (TLP) includes the DMA descriptor packet.

The link power controller 130 may transfer the packet with the DMA descriptor (that triggers adjusting of the power state of the link to be passed through) to the DMA engine (which is mentioned above). The DMA engine may be included in the I/O device or in the networking switch 100, for example. An example in which the DMA engine is included in the I/O device is described with reference to FIG. 2. An example in which the DMA engine is included in the networking switch 100 is described with reference to FIG. 3.

For example, when it is determined that there is a condition met of (i) the DMA operation being performed while the DMA descriptor packet that triggers adjusting of the power state of the link to be passed through and (ii) the I/O device connected to the networking switch 100 has not been used for a predetermined period of time, then the link power controller 130 may switch the power state of the link connected to the I/O device to the low power state (e.g., a low power state of L1 or L2).

The networking switch 100 may be, for example, a PCIe switch or a CXL switch.

In PCIe implementations, a link of a PCIe system may be composed of multiple lanes of which power may be adjusted by adjustment of the state of the link, which may have multiple link states. For example, a link state L0 may correspond to an active/normal state. Link states L0s, L1, and L2 may correspond to a low power state. More specifically, link state L0s may be an energy saving standby state with fast return to state L0. Link state may be a lower power standby state with a longer recovery than L0s. Link state L2 may be an auxiliary-powered deep-energy-saving state. There may also be a link state L3 which is a power-off state. The networking switch 100 may lower power consumption by turning off some devices of a PCIe physical link in the low power state or disabling an operation of some of the lanes. For example, in the PCIe switch, state L0s may save about 20% to 50% of power compared to state L0, state L1 may save about 90% (or more) of power compared to state L0, and state L2 may save about 99% of power compared to state L0. However, additional latency may be required when the networking switch 100 is switched from the active state to the low power state (or vice versa). Latency may increase as more power is saved.

Techniques described herein are applicable to CXL switches as well as PCIe switches. According to an example, when configuring a supernode of graph signal processing (GSP), a line width may be adjusted to extend a bandwidth or a power state may be adjusted to reduce energy by applying an operation of the networking switch 100 to a custom switch.

For example, when the DMA engine is included in the PCIe switch or the CXL switch, the networking switch 100 alone may perform the main operations described above. In addition, when information of switch link power state policy is added into the DMA descriptor after the host device begins performing the DMA operation, the host device may control link power in a desired manner.

FIG. 2 illustrates an example computer system including a networking switch, according to one or more embodiments. Referring to FIG. 2, a computer system 200 according to an example includes a host device 205, a networking switch 100, and I/O devices 250 and 260.

The host device 205 may include a processor 210 or a memory device (e.g., a dynamic random access memory (DRAM) 230) connected to the processor 210. The host device 205 may include a packet generator 215 which generates packets, including a DMA descriptor packet (e.g., a TLP with a DMA descriptor). The packet generator 215 may generate a TLP in response to a DMA request of an application in the host device 205, for example. The packet generator 215 is located in the host device 205 end or the processor 210, and may generate and add a DMA descriptor to the TLP when generating the TLP.

The host device 205 may generate and transfers a packet including a DMA descriptor packet corresponding to an operation involving the memory device (e.g., the DRAM 230) in response to a DMA request by an application. The packet may, for example, be a TLP, however, is not necessarily limited thereto.

The packet generator 215 may transfer the generated TLP to the I/O devices 250 and 260 via a PCIe or CXL system. Structure of the TLP and the DMA descriptor included therein are described in with reference to FIG. 4.

The packet generator 215 may add various pieces of information when generating a TLP, and a variety of methods may be used to add such information to the TLP. A first method uses a reserved bit R in a TLP header, and a second method uses a TLP prefix. The method in which the packet generator 215 adds new information to the TLP by using the reserved bit R in the TLP header and/or the TLP prefix is described with reference to FIG. 5A.

The information added to the TLP by these methods may take advantage of the ability to rapidly determine whether a packet received by the networking switch 100 is a DMA descriptor packet.

In addition, since CXL.io has a PCIe header format in a CXL environment (as shown in FIG. 5B), the new information may be added to the TLP in a CXL system in similar manner as described above.

The networking switch 100 adjusts a power state of a link that is to be passed through in a bus interface and may do so based on descriptor data that is obtained by decoding the DMA descriptor packet in the packet. The networking switch 100 may include the descriptor decoder 110 and the link power controller 130 as described above with reference to FIG. 1.

The descriptor decoder 110 may decode the DMA descriptor packet according to an indication that the TLP includes the DMA descriptor packet. For example, the descriptor decoder 110 may determine whether the TLP includes the DMA descriptor packet by decoding a reserved area, e.g., the reserved bit (included in a header of the TLP) or the prefix of the packet, based on a SDXI protocol. The reserved area may be defined by the host device. When the TLP includes the DMA descriptor packet, the descriptor decoder 110 may decode the DMA descriptor packet using a descriptor defined in data payload of the DMA descriptor packet.

The descriptor decoder 110 may confirm information about a source/destination address of data and a size of the data to be transferred by interpreting the DMA descriptor packet. At this time, to confirm the DMA descriptor in the networking switch 100, it may be necessary to identify a format of the DMA descriptor and extract necessary information. Since devices, including DMA devices, that follow the SDXI protocol have a fixed DMA descriptor format, the networking switch 100 may interpret information about the DMA descriptor. An example of a DMA format and operation code used in the SDXI protocol is described with reference to FIG. 6.

Also, the descriptor decoder 110 may add information used to adjust a power state of a link to be passed through by using the reserved area included in a descriptor format of the DMA descriptor packet.

The link power controller 130 may adjust a power state of a link to be routed within the networking switch 100 according to the size of the data, based on information obtained through the descriptor decoder 110. The link power controller 130 may restore the power state of the link after the DMA operation is finished (e.g., completed or otherwise). How the link power controller knows the previous power state of the link (its state before being adjusted) can vary. For example, the active state/link power state can be switched by toggling without having to store information about the previous state (e.g., toggling can return the state, implying the previous state). If it is desirable to control the power state in more detail, the previous information can be stored in a specific register and restored from same.

The I/O devices 250 and 260 may be, as non-limiting examples, a storage, a graphics processing unit (GPU), a network interface card or controller (NIC), and/or a memory pool. The I/O devices 250 and 260 may perform the DMA operation via a link that has the adjusted power state. The I/O device 250 may include a DMA engine 270, and the I/O device 260 may include a DMA engine 280. In this case, the DMA engines 270 and 280 that perform DMA operations may be included in the I/O devices as shown in FIG. 2, or may be included in the networking switch 100 as shown in FIG. 3.

When the DMA engines 270 and 280 are included in the networking switch 100, the networking switch 100 may automatically adjust the power state of the link to be passed through, according to whether the DMA engines 270 and 280 perform the DMA operation. In other words, when the networking switch 100 and the I/O devices 250 and 260 each have a DMA engine, the DMA engines of the I/O devices 250 and 260 may have priority over the DMA engine of the networking switch 100 for performing the DMA operation.

The host device 205, the networking switch 100, the DMA engines 270 and 280, and the I/O devices 250 and 260 may communicate, for example, based on any suitable version of the SDXI protocol.

Figure 3:
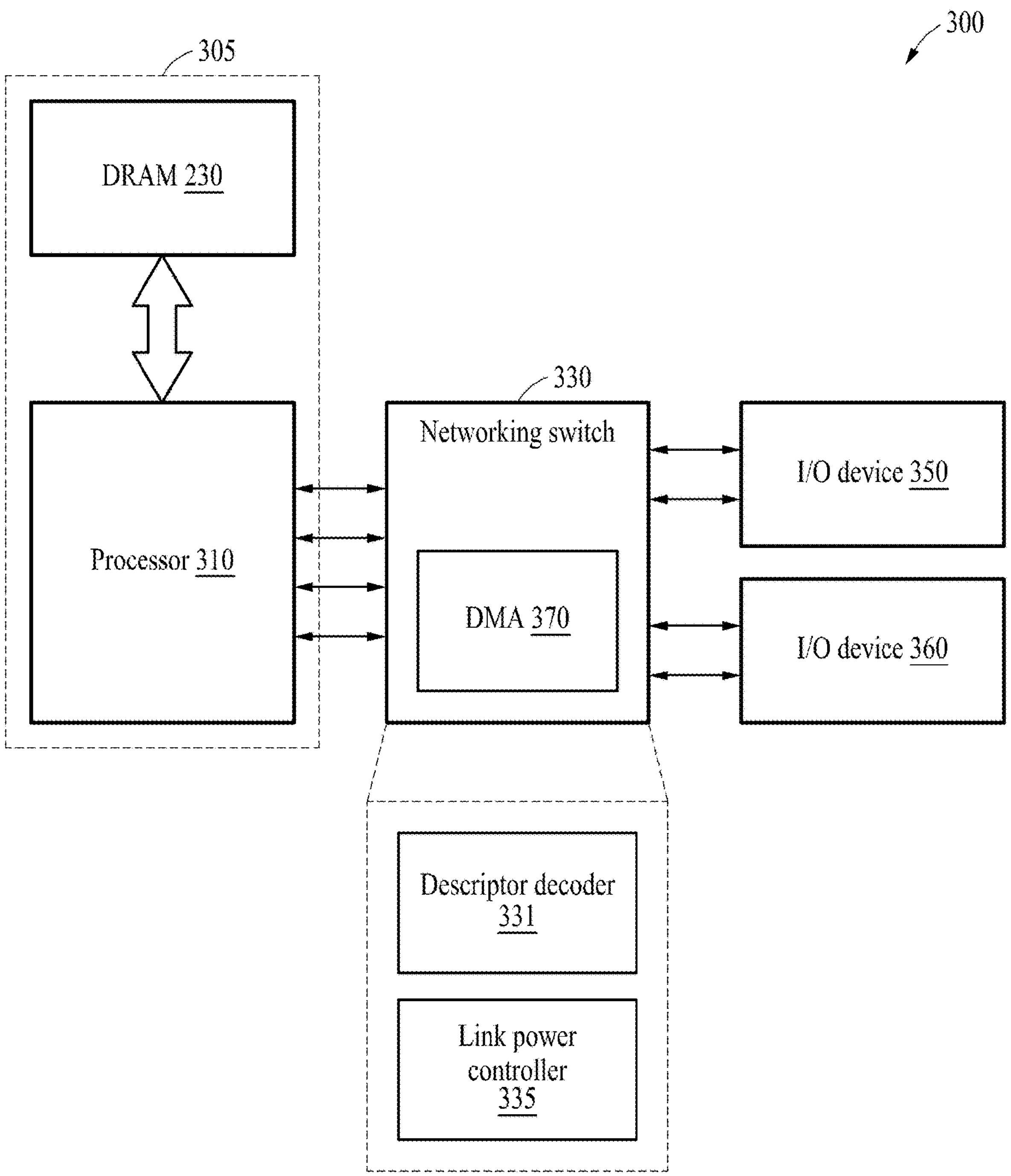
FIG. 3 illustrates an example computer system including a networking switch, according to one or more embodiments.

FIG. 3 illustrates an example computer system including a networking switch, according to one or more embodiments. FIG. 3 shows a view 300 of an operation in an example case where a processor 310 (of a host device 305) of the computer system does not include/implement a packet generator (or such is inoperative for some reason) and the networking switch 330 includes a DMA engine 370, but the I/O devices 350 and 360 to do not include a DMA engine (or such is inoperative, unavailable, etc.).

In this example where the networking switch 330 includes a DMA engine (the DMA engine 370), the networking switch 330 may operate alone without a data packet being transferred by the host device 305. The host device 305 may be, for example, the processor 310, or the processor 310 combined with a memory device (e.g., the DRAM 230).

When the host device 305 accesses a control register of the DMA engine 370, the networking switch 330 may recognize access of the host device 305 to the control register. In this case, the networking switch 330 may obtain and interpret descriptor data from the host device 305. The networking switch 330 may adjust the power state of the link to be passed through to, for example, the active state or the low power state, and may do so by interpreting DMA descriptor data and analyzing a related path.

Description of the operations of the descriptor decoder 110 and the link power controller 130 is generally applicable to a descriptor decoder 331 and a link power controller 335 of the networking switch 330.

Figure 4:
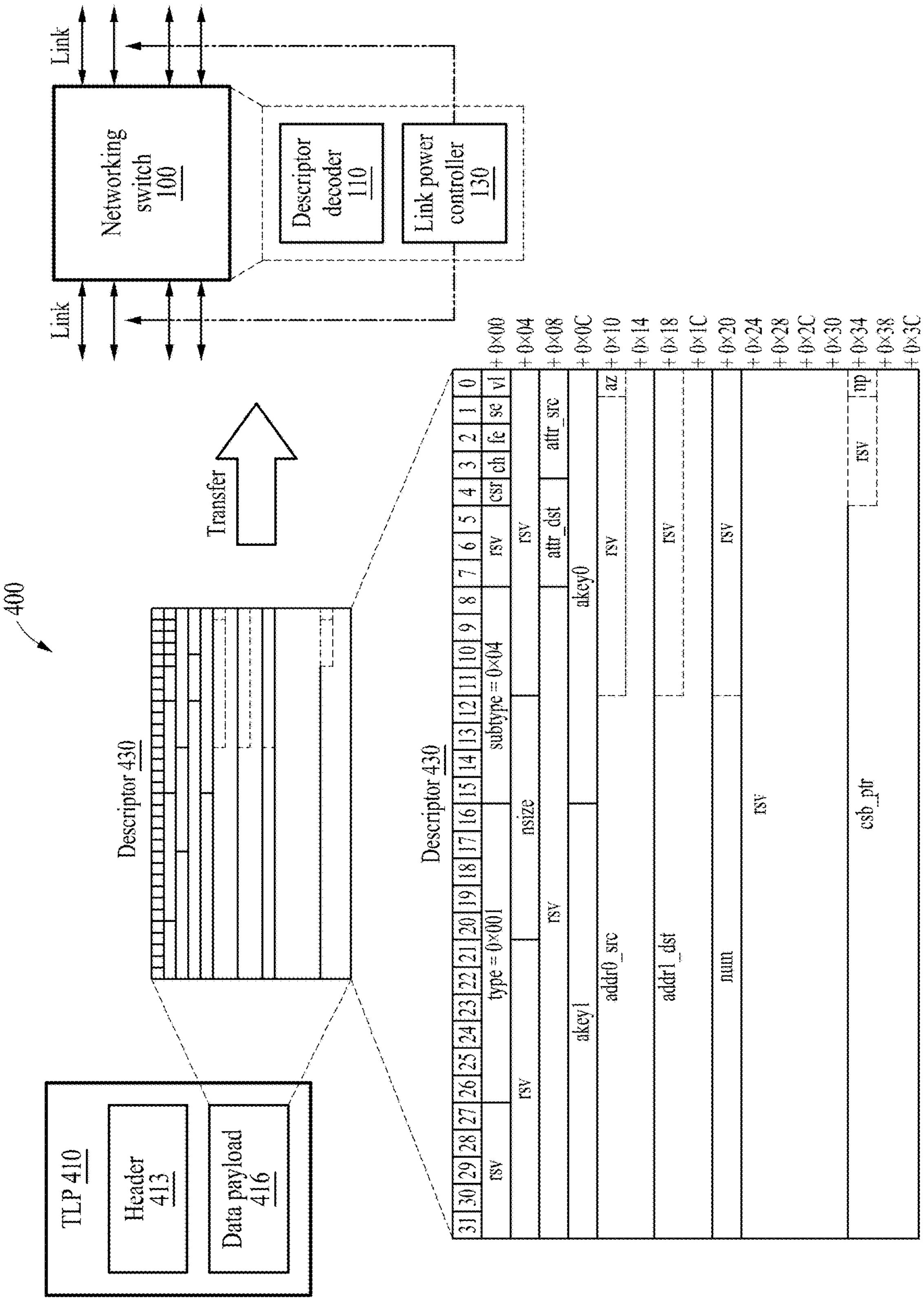
FIG. 4 illustrates an example direct memory access (DMA) descriptor included in a packet, according to one or more embodiments.

FIG. 4 illustrates an example of a DMA descriptor included in a packet, according to one or more embodiments. FIG. 4 shows a view 400 of a packet (e.g., a TLP 410) transferred to the networking switch 100 according to an example and the structure/format of a DMA descriptor 430 included in the TLP 410.

The TLP 410 may include a header 413 and data payload 416. The header 413 may include information related to instructions (e.g., memory write, memory read, completion with data, etc.) used in PCIe, addresses, a length of the data payload 416, and the like.

The header 413 may include, for example, the following fields: Fmt/Type fields, a traffic class, a sequence number, a tag, a requester identification (ID), a packet length, first DW BE, last DW BE, a field (length DW) indicating a data length of a TLP, an address, a data sequence number, and the like. Here, first DW BE may be a byte-enable field of a first DW of data payload of the TLP, and the last DW BE may be a byte-enable field of a last DW of data payload of the TLP. The DW may be a field whose content is a data length of the TLP.

The data payload 416 may include the DMA descriptor 430. The DMA descriptor 430 may have, for example, two channel descriptor structures for each DMA channel. This structure may include the number of elements, the size of data, a transfer type, a reserved area, and the like to be transferred between a source address and a destination address.

FIG. 5A illustrates an example structure of a packet including a DMA descriptor generated by a packet generator, according to one or more embodiments. FIG. 5A shows a view 500 of an example TLP that includes a DMA descriptor generated by a packet generator (e.g., the packet generator 215 of FIG. 2).

A TLP header 510 has a structure/format in a case of transferring the DMA descriptor in a data payload (of a TLP) from the PCIe and performing an operation of memory-write. A TLP header 530 has a structure/format in a case of transferring the DMA descriptor in a data payload (of a TLP) from the PCIe and performing an operation of completion-with-data.

When generating a TLP that carries DMA descriptor information in its payload area, the packet generator may indicate the presence of that information (indicating, e.g., performing of the operation of memory-write or the operation of completion-with-data) in the TLP. The packet generator may generate a TLP including a TLP request having the DMA descriptor information in its data payload. The TLP request may include, for example, the operation of memory-write and the operation of completion-with-data.

The packet generator may indicate the presence (or information about) the DMA descriptor information in the TLP in various ways. For example, the TLP headers 510 and 530 may include unused reserved bits R 511, 531, and 533 (reserved under the defined TLP header format). The packet generator may add the information about/indicating the presence of the DMA descriptor in the TLP by using the reserved header bits R 511, 531, and 533. The packet generator may add information that may indicate that the packet (e.g., the TLP) includes a DMA descriptor by using the reserved bits R 511, 531, and 533. This descriptor-signaling information may allow a device handling the TLP to decide whether the TLP needs DMA-descriptor processing without having to process the payload of the TLP.

In addition, as shown in the view 550, the packet generator may indicate the presence of a DMA descriptor (i.e., add DMA descriptor information) by adding prefix information to the TLP. In PCIe, a TLP prefix may be defined so as to transfer additional information other than the TLP header. The packet generator 215 may add more information to the TLP using the TLP prefix. When the prefix information is added to the TLP, for example, a packet overhead of 4 bytes may be added.

Additionally, the packet generator may indicate the DMA descriptor information with a message (a vendor-defined message) defined by a manufacturer.

FIG. 5B illustrates an example format of a peripheral component interconnect express (PCIe) packet in CXL.io, according to one or more embodiments.

Since CXL.io has a PCIe header format in both PCIe and CXL environments, in the case of a CXL environment, new information may be added to the TLP in the CXL environment in the same manner as described above. When the DMA is operated in the CXL protocol, CXL.io is generally used, and the same techniques may be applied in the CXL protocol because it is the same method as PCIe.

From a viewpoint of a host device, the CXL is an interconnect standard suitable for an accelerator and a memory device connected to a CXL host. Implementation of CXL may provide a delay time on the order of microseconds so that servers for high speed/volume computation may use a memory pool as a memory, and may support memory semantic load/store instructions. A CXL device may support a PCIe interface, a memory operation, and/or a cache operation.

Figure 6:
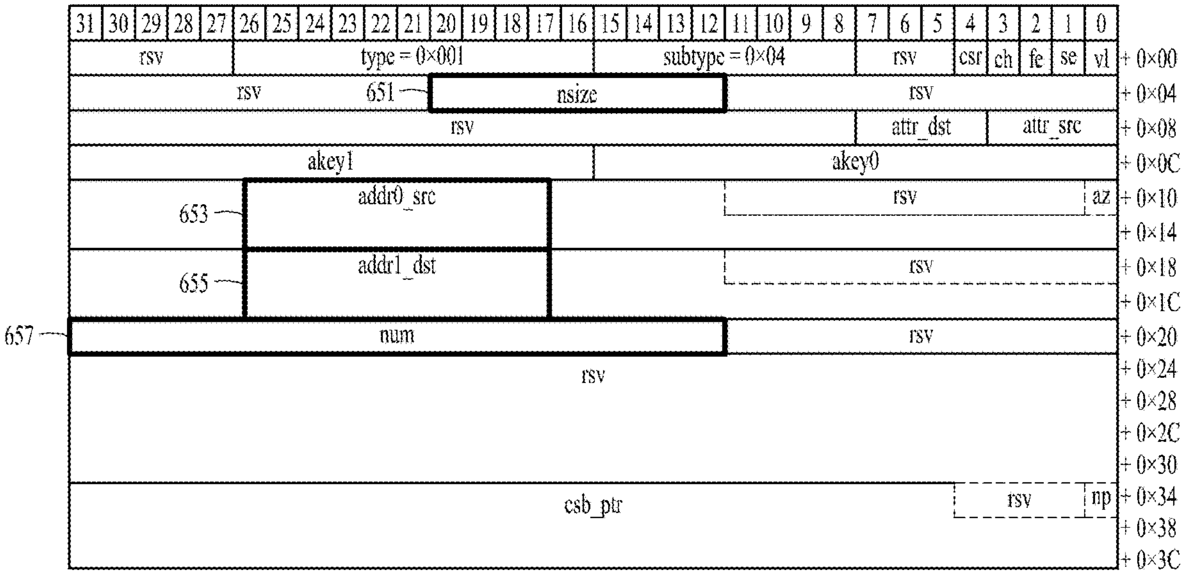
FIG. 6 illustrates an example operation of a descriptor decoder, according to one or more embodiments.

FIG. 6 illustrates an example operation of a descriptor decoder, according to one or more embodiments. In FIG. 6, views 610 and 630 show a DMA format and operation code used in the SDXI protocol according to an example, and view 650 shows a descriptor format of operation code DMA_RECOPY, which is an example of a DMA descriptor.

The descriptor decoder (e.g., the descriptor decoder 110 of FIG. 1) may obtain descriptor data by decoding A DMA descriptor included in a packet (e.g., the TLP). The size of a descriptor used in the SDXI protocol is 64 bytes, and DMA instructions used in the SDXI protocol may be interpreted through type/subtype in first 4 bytes (of the TLP header). At this time, the form of remaining data may vary for each corresponding instruction.

For example, a descriptor DMA_REPCOPY (a DMA descriptor) shown in the view 650 is a type of DMA operation, and a DMA controller may perform a function of directly copying data from a memory to another memory without intervention of a processor for the copying of the memory.

The descriptor DMA_REPCOPY may cause copying up to a maximum buffer size between a source and a destination. The maximum buffer size may be, for example, 2 megabytes, as a non-limiting example. The copying may be performed multiple times based on the descriptor DMA_REPCOPY. A size of the entire destination data may be, for example, 4 kilobytes*(nsize 651+1)*(num 657+1) (651 and 657 are reference numbers in FIG. 6).

The DMA controller may perform the memory copying based on the received addresses of the source and the destination, the size of the data to be copied, and the like as elements.

The descriptor decoder may decode the DMA descriptor packet (e.g., TLP with DMA descriptor in its payload), and obtain descriptor data, such as an operation, source/destination addresses, and the size of the data to be copied from a memory device or a memory to an I/O device, included in the DMA descriptor, as described above.

More specifically, the descriptor decoder may identify a source (start) address and a destination (end) address of the DMA descriptor through addr0_src (653) (source)/addr1_dst (655) (destination) included in the DMA descriptor. In addition, the descriptor decoder may confirm information indicating the amount of data to be transferred through information of the nsize 651 and/or the num 657 included in the DMA descriptor. A link power controller may adjust the power state of link(s) connected in the networking switch according to a situation determined through descriptor data decoded by the descriptor decoder.

In addition, the DMA descriptor may include many reserved areas (rsv). The packet generator adds, in the reserved area(s) of the DMA descriptor, information usable by the networking switch to adjust the power, thus using the networking switch to control a link power more precisely. The information added to the reserved areas may be used to adjust the power state of the link in the link power controller.

Figure 7A:
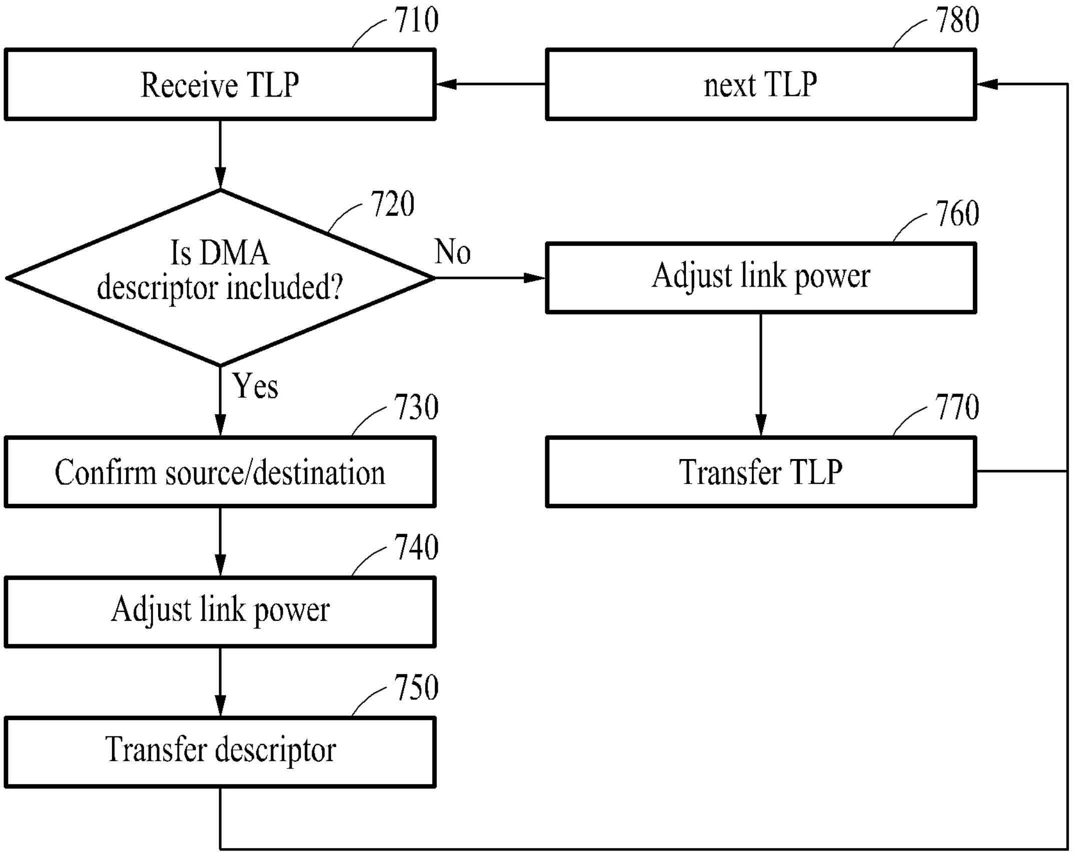
FIGS. 7A and 7B illustrate an example operation of a link power controller, according to one or more embodiments.
Figure 7B:
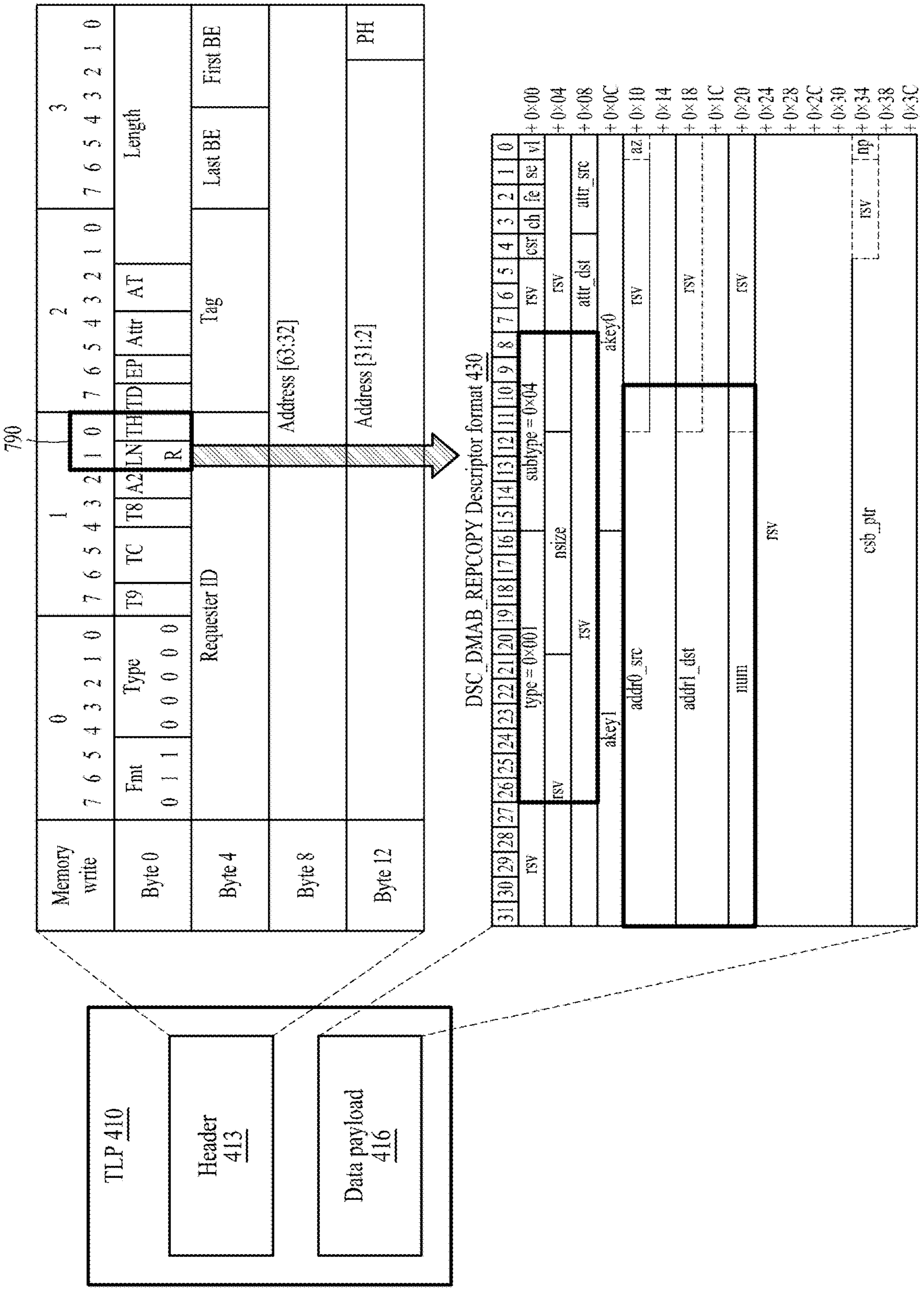

FIGS. 7A and 7B illustrate an example operation of a networking switch, according to one or more embodiments. Referring to FIGS. 7A and 7B, a networking switch according to an example may adjust a link power through operations 710 to 780.

To summarize, after confirming the DMA descriptor information, the networking switch may adjust a power state of a link to be passed through in a bus interface connected to the networking switch based on the DMA descriptor information. Details follow.

In operation 710, the networking switch may receive and examine (parse) a TLP.

In operation 720, the networking switch may determine, as a result of the examination, whether the TLP includes a DMA descriptor. The networking switch may determine whether the TLP includes the DMA descriptor by checking a reserved area 790 of the header 413 of the TLP 410 as shown in FIG. 7B. For example, when a value of the reserved area 790 is set to "1", the networking switch may determine that the TLP includes the DMA descriptor in its payload area. When the value of the reserved area 790 is set to "0", the networking switch may determine that the TLP does not include the DMA descriptor.

Responsive to operation 720 determining that the TLP includes the DMA descriptor, the networking switch may analyze the DMA descriptor according to a descriptor format 430 (in a form defined according to the SDXI protocol) to confirm the data payload 416 of the TLP 410.

In operation 730, when the TLP has been determined to include a DMA descriptor, in operation 730, the networking switch may parse/interpret the DMA descriptor (according to its known format) to confirm/obtain a source address and a destination address to which data is to be transferred.

In operation 740, the networking switch may adjust the power of a link related to the addresses. At this time, as described next, the adjust, for example, the power of the link, and the nature of the adjustment (new state) may be determined using various pieces of information, such as operation code, a size of data, source/destination states, and the like.

For example, when a large amount of bandwidth is used to copy a large amount of data from a memory to an I/O device, the networking switch may perform the DMA by changing a link state from a state L0p (where a link width is reduced) to another state where the link width is increased to the maximum. This adjusting of the power of the link may add overall latency, however, the networking switch may obtain an effect of reducing power by configuring policy according to a size of data, for which the DMA is to be performed, a current power state, a power state to be changed-to, and latency required to switch the power state.

In operation 750, the networking switch may transfer the DMA descriptor to the link to be passed through in the bus interface connected to the networking switch to reflect a result of adjusting the link power. At this time, when the power state has already been adjusted, the networking switch may directly transfer the DMA descriptor.

In operation 760, even when it is has been determined in operation 720 that the TLP does not include a DMA descriptor, the networking switch may adjust the link power according to a situation (some other conditions). In operation 760, for example, even when the TLP does not include the DMA descriptor, the networking switch may adjust the link power in a case of a non-DMA request with a small size of data. In a case of a request with a small size of data, the networking switch may switch the link power to the low power state. The networking switch may adjust the link power and then transfer the TLP to the link to be passed through in the bus interface.

Operation 760 may be optional (this does not imply that all other operations are required). When performing operation 760, additional overall latency overhead may be increased due to the power state. When fast processing is required, the networking switch may skip the operation in operation 760 and immediately transfer the TLP through operation 770. After that, in operation 780, the networking switch may receive a new TLP and examine whether it includes the DMA descriptor packet.

According to an example, the networking switch may adjust the power state of the link by using the reserved area included in the DMA descriptor. For example, when the I/O device is not accessed for a certain period of time after performing a DMA operation, the networking switch may further lower the power state of the link to be passed through in the bus interface connected to the networking switch to switch the power state to a low power state such as L1 or L2.

For example, when the host device includes a profiler and the profiler recognizes a period of an inactive state in which DMA operations are not performed, the host device may add the time information into the DMA descriptor such that the networking switch switches the power state to the low power state or a power down state during the period of the inactive state and is automatically woken up after the end of the period.

Figure 8:
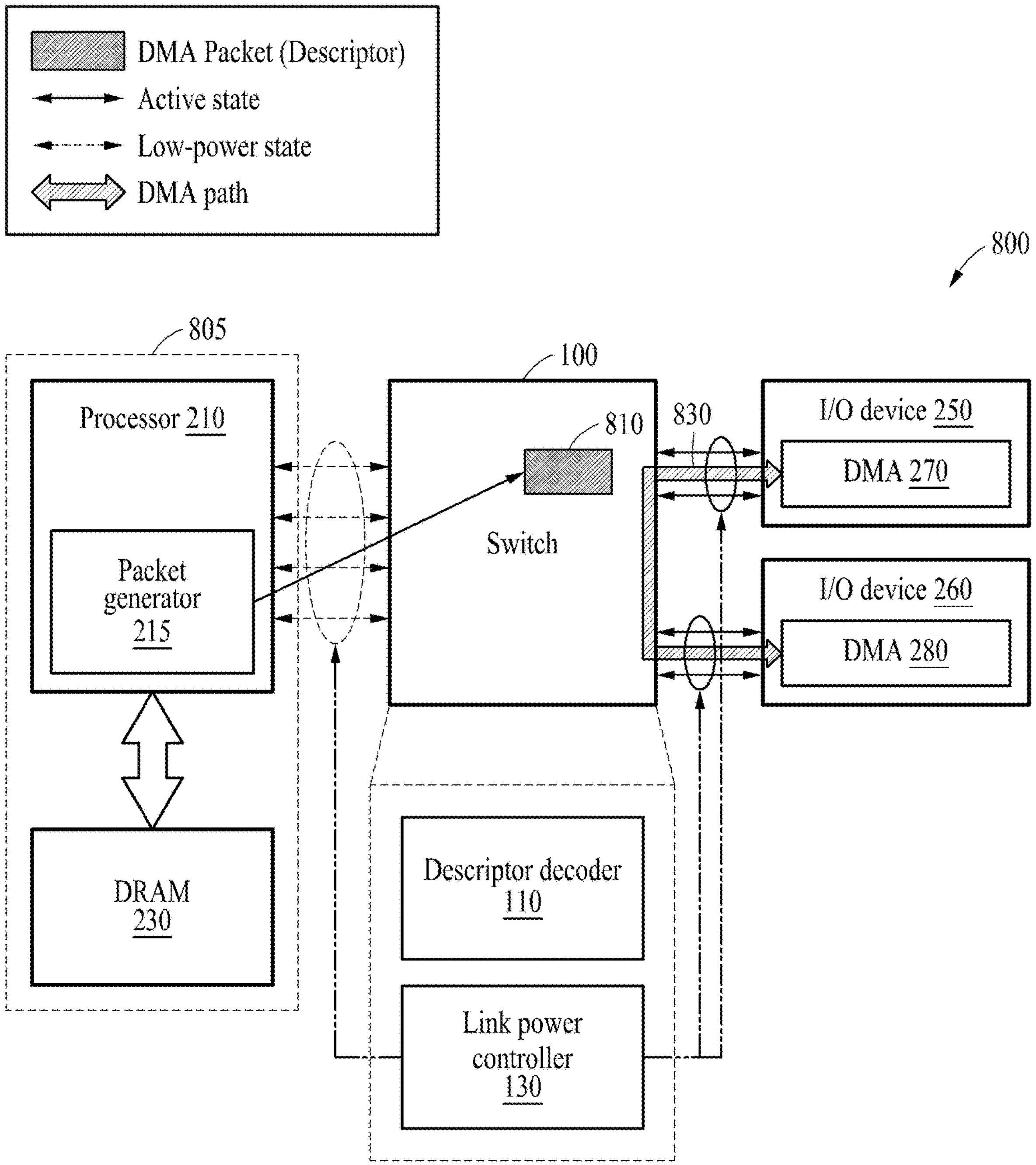
FIG. 8 illustrates an example operation of a computer system in which one host device and a multiple I/O devices are connected to one networking switch, according to one or more embodiments.

FIG. 8 illustrates an example operation of a computer system in which one host device and multiple I/O devices are connected to one networking switch, according to one or more embodiments.

FIG. 8 shows a view 800 of an example computer system with one host device 805 and two or more I/O devices 250 and 260 connected to the networking switch 100. The networking switch 100 transfers the DMA descriptor to the I/O devices 250 and 260 in a case of performing the DMA by the I/O devices 250 and 260. The host device 805 may be, for example, the processor 210 or the processor 210 connected to the DRAM 230.

For example, in the computer system in which the one host device 805 and the two or more I/O devices 250 and 260 are connected to the networking switch 100, a DMA operation may be performed by the I/O devices 250 and 260. In this case, the host device 805 may have a DMA descriptor. The host device 805 generates a DMA packet 810 (e.g., a TLP containing a DMA descriptor) by the packet generator 215 to perform the DMA operation for the I/O devices 250 and 260.

The host device 805 may transfer the generated DMA packet 810 to the networking switch 100. The networking switch 100, which has received the DMA packet 810, may obtain descriptor data by the descriptor decoder 110 decoding the DMA descriptor included as the payload in the DMA packet 810. The networking switch 100 may, in advance, activate a DMA path 830 corresponding to the I/O devices 250 and 260, where the DMP path 830 is for performing the DMA operation, and where the DMA path 830 is activated through the link power controller 130. The networking switch 100 may then transfer the DMA descriptor to the DMA engine 270 included in the I/O devices 250 and 260 (DMA packet 810 is transferred, and the DMA descriptor is transferred as its payload).

As shown in FIG. 8, when there are more than I/O devices connected to the networking switch 100, and when those I/O devices perform DMA operations for a memory device (e.g., the DRAM 230), the networking switch 100 may, by the link power controller 130, maintain the link to be passed through in the active state in a bus interface of a target I/O device to perform the DMA operation among the plurality of I/O devices 250 and 260, and may transfer a DMA descriptor packet (e.g., the DMA descriptor packet 810) through the link in the active state.

At this time, a path between the I/O devices 250 and 260 (through the networking switch 100) is in the active state, and a path between the host device 805 and the networking switch 100 may be in a low power state.

The I/O devices 250 and 260 may perform the DMA according to information about the received DMA descriptor. After the DMA is terminated, the networking switch 100 may change the path between the networking switch 100 and the I/O devices 250 and 260 from the active state to the low power state again, or change the state according to the policy.

Figure 9:
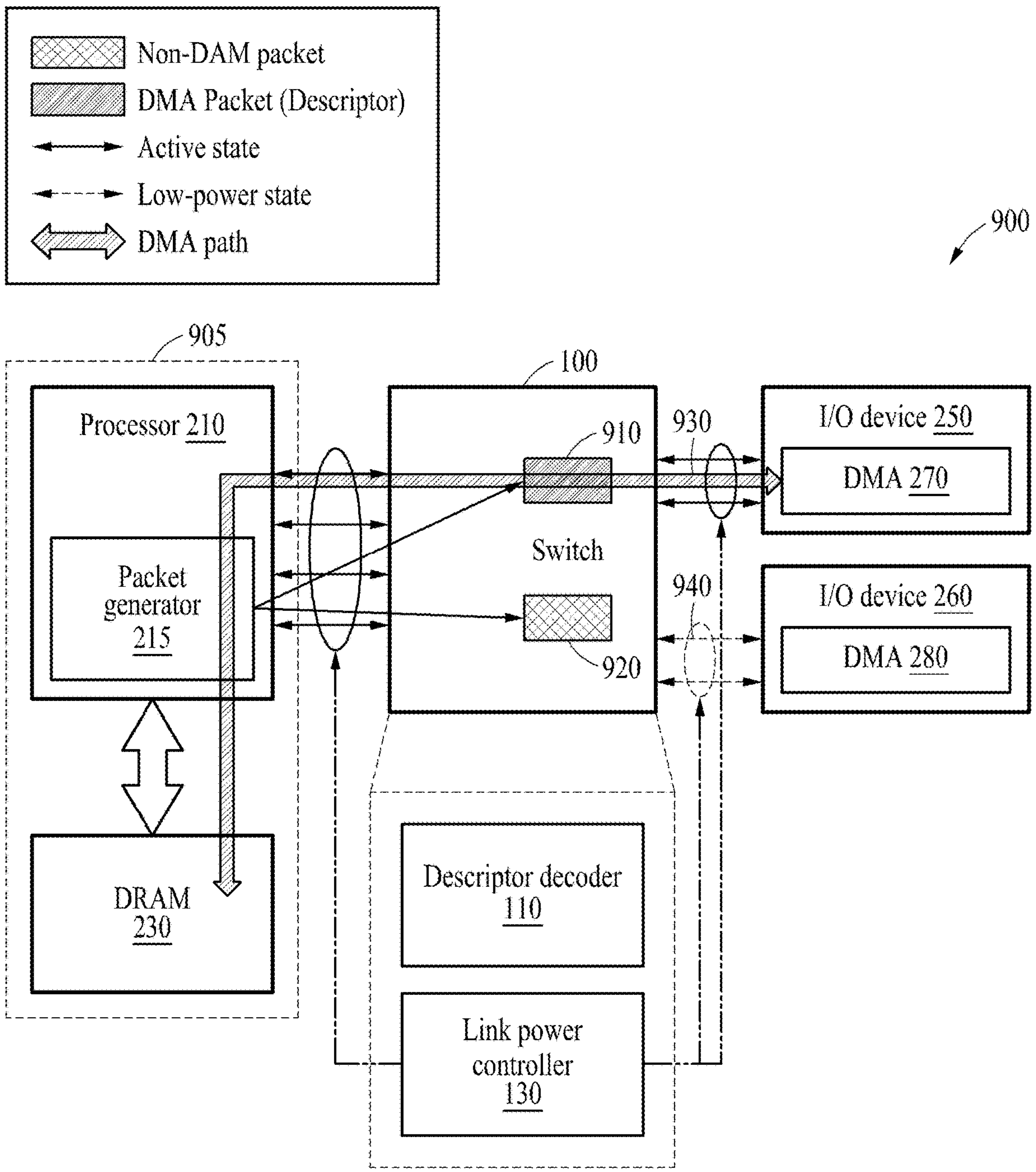
FIG. 9 illustrates an example method in which a networking switch adjusts a power state of a link by distinguishing a packet in a computer system, according to one or more embodiments.

FIG. 9 illustrates an example method in which a networking switch adjusts a power state of a link by distinguishing a packet in a computer system, according to one or more embodiments.

FIG. 9 shows a view 900 of example in which, when the two I/O devices 250 and 260 and one host device 905 interconnected through the networking switch 100, the networking switch 100 controls a link power by distinguishing a path through which a DMA packet 910 and a non-DMA packet 920 are transferred (distinguishing between these types of packets is described above). The host device 905 may be, for example, the processor 210 or the processor 210 connected to the DRAM 230. Here, the "DMA packet" 910 may refer to a packet including the DMA descriptor, and the "non-DMA packet" 920 may refer to a packet not including the DMA descriptor.

According to an example, in addition to generating TLPs that carry DMA descriptors (DMA packets), the packet generator 215 may also generate other kinds of TLP packets that include TLP information other than the DMA descriptor.

When the processor 210 in the host device 905 has DMA descriptor information, the packet generator 215 may generate the DMA packet 910 including the DMA descriptor. On the other hand, when the processor 210 some information other than the DMA descriptor information, the packet generator 215 may generate the non-DMA packet 920 that does not include a DMA descriptor.

When the host device 905 transfers the DMA packet 910 and the non-DMA packet 920, the networking switch 100 may check for a DMA descriptor in each packet, and when found (in the DMA packet 910) analyze the DMA descriptor in the packet containing same. Based thereon, the networking switch may change, to the active state, a state of a link between the I/O device 250 (that is to perform the DMA operation) and the host device 905. If the packet is a non-DMA packet 920 that does not include a DMA descriptor, the networking switch 100 may (i) change the link state of a non-DMA path 940 through which the non-DMA packet 920 is transferred, to the low power state, or (ii) maintain the existing state. The networking switch 100 may change each link to the low power state or, after the DMA is terminated, it may change each link to a state according to the policy.

As described above, the networking switch 100 may determine to treat all packets not including a DMA descriptor as the non-DMA packets 920. The networking switch 100 may modify (e.g., flag, configure) the descriptor-lacking packets to indicate that they are non-DMA packets 920 through additional information, as discussed above.

Through, for example, modifying the headers of DMA packets (e.g., a TLP with a DMA descriptor in its payload) to indicate the presence or absence of a DMA descriptor, distinction between DMA and non-DMA packets (e.g., TLPs) may be readily ascertained by a transaction layer module by parsing the TLP's headers rather than having to repeatedly attempt to extract (from the payload) and/or decode the DMA descriptor, which may improve packet-processing performance.

The networking switch 100 may confirm that, among received packets, one is the non-DMA packet 920, and adjust power of a corresponding path (link) to be routed. At this time, the non-DMA path 940 for transferring the non-DMA packet 920 may be determined not to be in active use, and thus may be changed to a low power state. When the DMA packet 910 is transferred through the corresponding path (the non-DMA path 940), the networking switch 100 may switch the power state of the corresponding path back to the active state. In this case, the non-DMA path 940 may be switched back to the DMA path 940.

As described above, the networking switch 100 may switch the DMA path 930 for transferring the DMA packet 910 to the active state, and switch the non-DMA path 940 for transferring the non-DMA packet 920 to the low power state. As noted above, there may be other or additional conditions, depending on implementation. For example, changing a link to a low power state might also require that more than some minimum amount of data is to be transferred.

Figure 10:
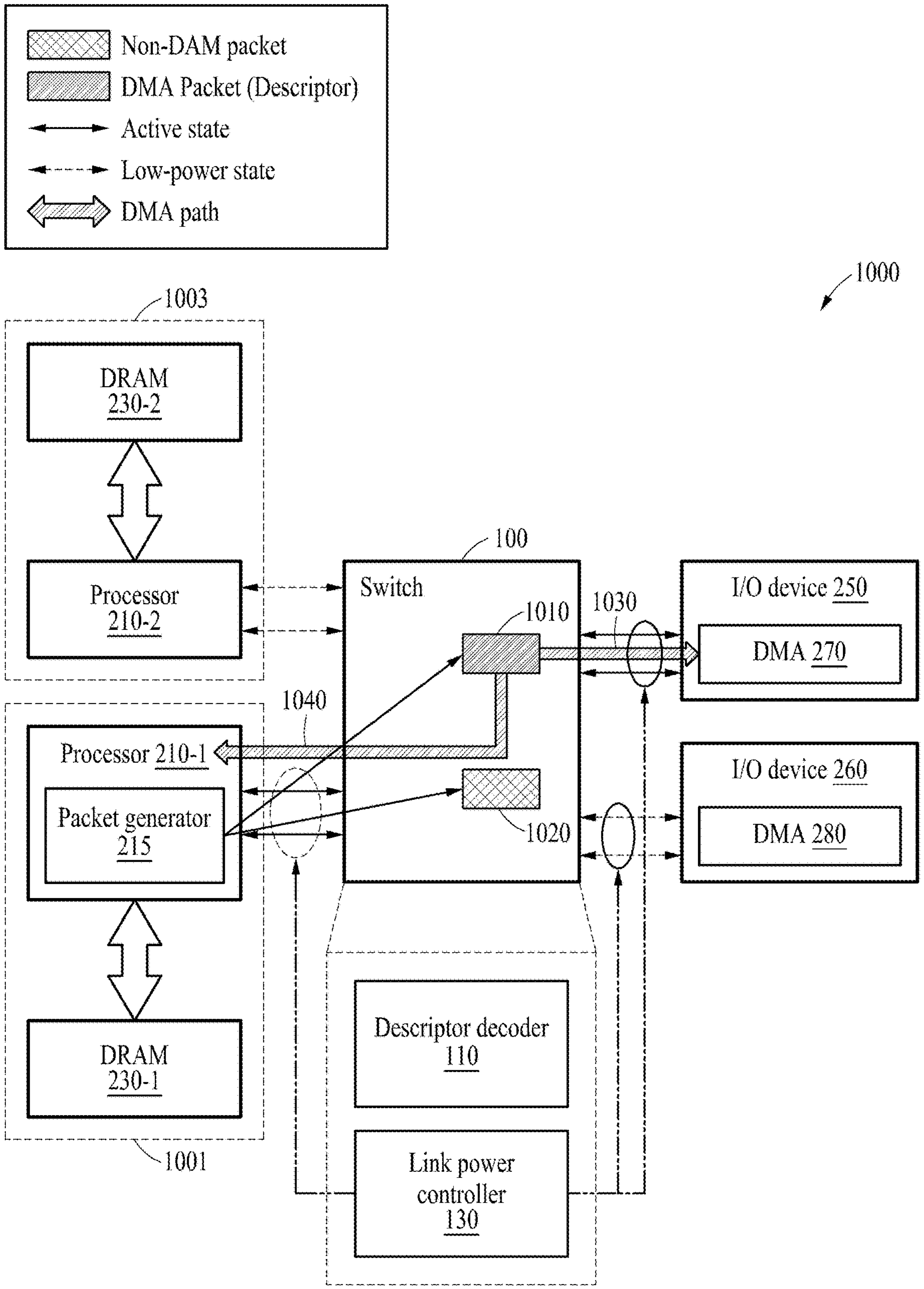
FIG. 10 illustrates an example operation of a computer system in which host devices and I/O devices are connected to one networking switch, according to one or more embodiments.

FIG. 10 illustrates an example operation of a computer system in which host devices and I/O devices are connected to one networking switch, according to one or more embodiments.

FIG. 10 shows a view 1000 of an example in which, when two host devices (e.g., a first host device 1001 and a second host device 1003) and the two I/O devices 250 and 260 are connected through the one networking switch 100; the networking switch 100 controls link power by distinguishing (and treating differently) paths through which a DMA packet 1010 and a non-DMA packet 1020 are transferred.

In this case, the first host device 1001 may include a processor 210-1 or the processor 210-1 connected to a DRAM 230-1. Also, the second host device 1003 may include a processor 210-2 or the processor 210-2 connected to a DRAM 230-2.

When each of the host devices 1001 and 1003 includes a packet generator, each of the host devices 1001 and 1003 may generate a packet (e.g., the DMA packet 1010 or the non-DMA packet 1020) through each packet generator (e.g., the packet generator 215, which is also included in, but not shown in, processor 210-2) and transfer the packet to the networking switch 100.

The networking switch 100 may change, to the active state, a link power state of a path (between the first host device 1001 and the I/O device 250 to perform the DMA) through which the DMA packet 1010 is transferred, and may do so by interpreting the packet transferred by the host devices 1001 and 1003, and maintain a link power state of remaining/other paths (e.g., a path between the second host device 1003 and the I/O device 260 through which the non-DMA packet 1020 is transferred) to the low power state. After the DMA operation is terminated, the networking switch 100 may change the link power state according to the policy or maintain the link power state as it is.

Thus, when there are two or more host devices, and a first packet (e.g., the DMA packet 1010) including a DMA descriptor packet and a second packet (e.g., the non-DMA packet 1020) not including a DMA descriptor packet are transferred from the host devices 1001 and 1003, the link power controller 130 of the networking switch 100 may switch the link to be passed through by the first packet to the active state, and switch the link to be passed through by the second packet to the low power state.

Figure 11:
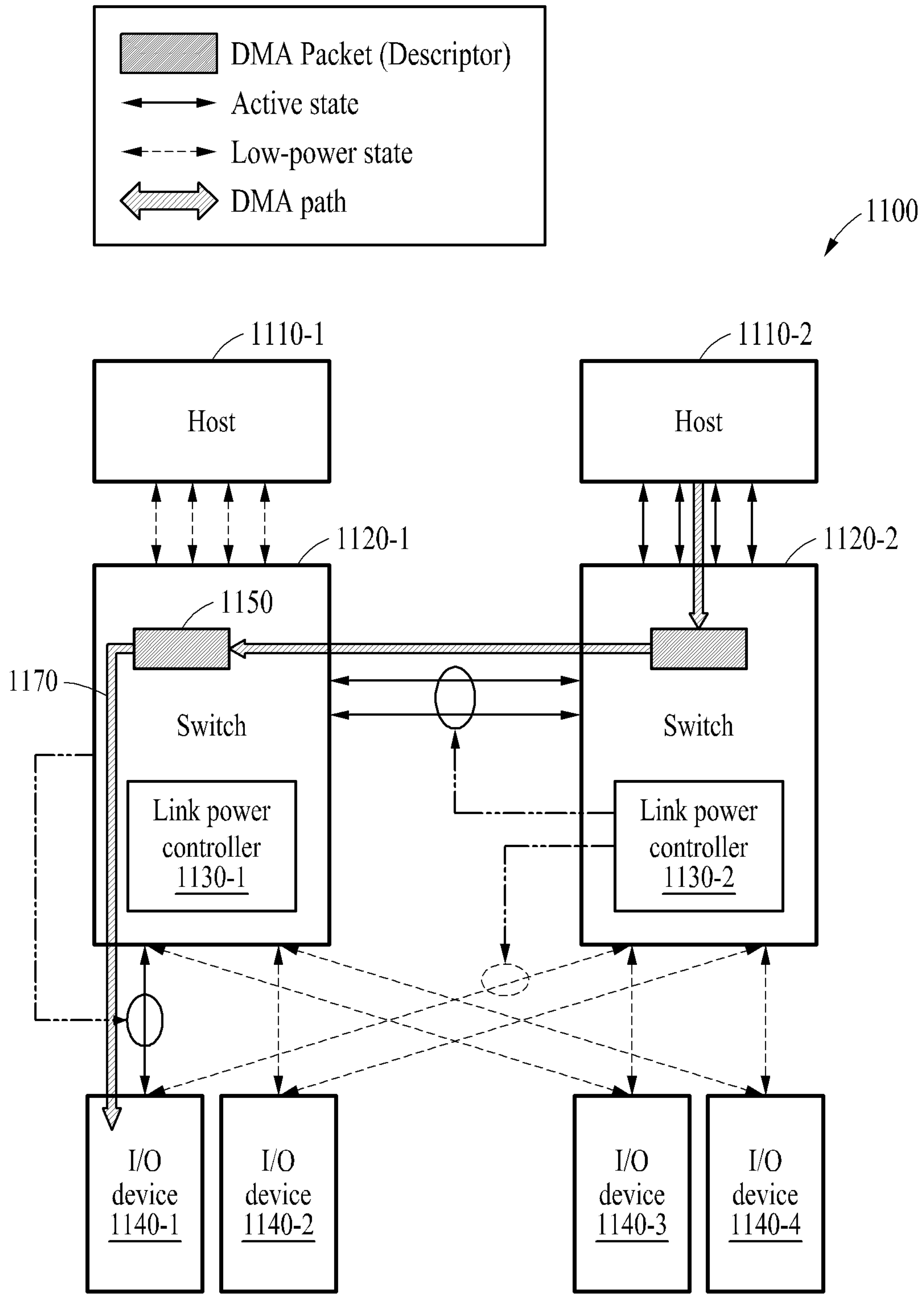
FIG. 11 illustrates an example operation of a computer system in which host devices and I/O devices are connected to networking switches, according to one or more embodiments.

FIG. 11 illustrates an example operation of a computer system in which host devices and I/O devices are connected to networking switches, according to one or more embodiments.

FIG. 11 shows a view 1100 of an example of controlling link power when two host devices (e.g., a first host device 1110-1 and a second host device 1110-2) and four I/O devices 1140-1, 1140-2, 1140-3, and 1140-4 are connected to two networking switches 1120-1 and 1120-2.

In a multi-switch environment including two networking switches 1120-1 and 1120-2, a path to be routed may be switched to the active state, and a path not to be routed may be switched to the low power state.

Each of the host devices 1110-1 and 1110-2 may generate a DMA packet through its own packet generator and transfer their DMA packet to their networking switch. It may be assumed that the networking switch 1120-2 that has received the DMA packet and may perform decoding to determine that a path for transferring a DMA packet 1150 is not a path connected to the networking switch 1120-2. In this case, the networking switch 1120-2 (which received the DMA packet 1150) may transfer the DMA packet 1150 to the other networking switch 1120-1. At this time, the networking switch 1120-1, which has received the DMA packet 1150, may confirm DMA descriptor information of the DMA packet 1150 and according thereto route the DMA packet 1150 in its own path. In this case, a link power controller 1130-1 of the networking switch 1120-1 may transfer the DMA packet 1150 to the I/O device 1140-1, and switch a link power state of the related path 1170, through which the DMA packet 1150 is transferred, from the low power state to the active state.

Figure 12:
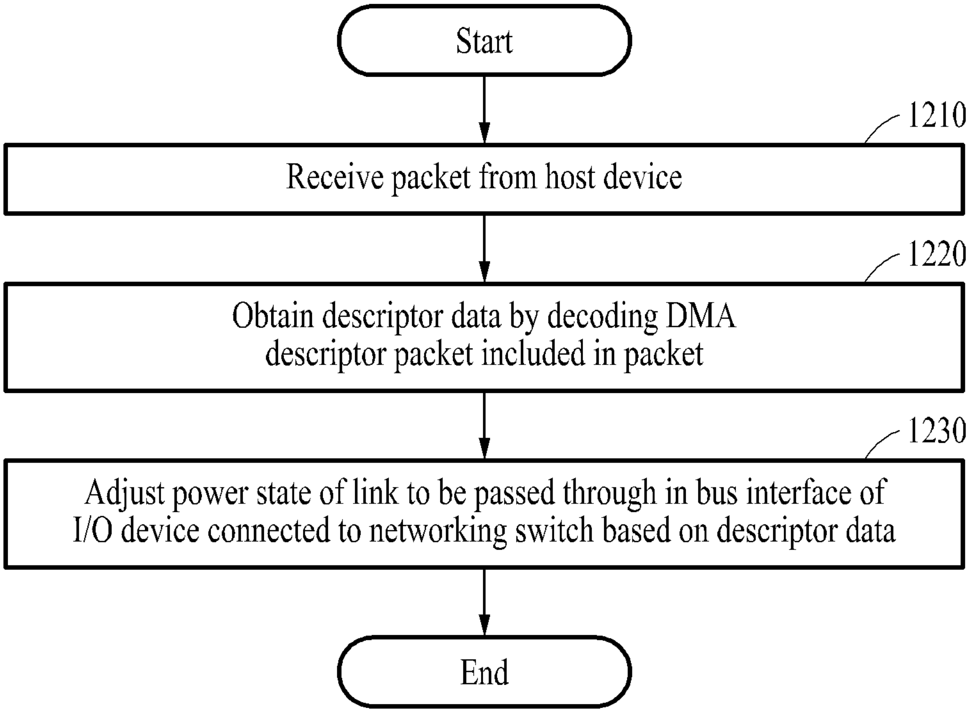
FIG. 12 illustrates an example method of operating a networking switch, according to one or more embodiments.

FIG. 12 illustrates a method of operating a networking switch, according to one or more embodiments. Operations to be described hereinafter with reference to FIG. 12 may be performed sequentially, but not necessarily performed sequentially. For example, the order of the operations may be changed and at least two of the operations may be performed in parallel or one of the operations may be performed in parts.

Referring to FIG. 12, a networking switch according to an example may adjust a power state of a link to be passed through, through operations 1210 to 1230.

In operation 1210, the networking switch receives a packet from a host device.

In operation 1220, the networking switch decodes a DMA descriptor packet included in the packet received in operation 1210 to obtain descriptor data.

In operation 1230, the networking switch adjusts a power state of a link to be passed through in a bus interface connected to the networking switch based on the descriptor data obtained in operation 1220. The networking switch may adjust the power state of the link to be passed through, based on at least one of whether to perform a DMA operation for a memory device, a size of data to perform the DMA operation, a current power state of the link to be passed through, a power state to be changed of the link to be passed through, or latency for switching of the power state of the link to be passed through. For example, when the size of the data to perform the DMA operation for the memory device is smaller than a predetermined reference size, the networking switch may adjust the power state of the link to be passed through to the low power state independently of whether the packet includes the DMA descriptor packet.

The method of operating the networking switch according to an example may be applied to multiple host devices and multiple devices including DMA engines, connected to the networking switch. The method may also be applied to a multiple computing environment in which devices are connected to a PCIe switch, and may also be applied to a SDXI protocol environment.

The examples described herein may be implemented using a hardware component, a software component (in the form of instructions/code), and/or a combination thereof. A processing device may be implemented using one or more general-purpose or special-purpose computers, such as, for example, a processor, a controller, an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will appreciate that a processing device may include multiple processing elements and/or multiple types of processing elements. For example, the processing device may include multiple processors (of a same or varying type), or a single processor and a single controller. In addition, different processing configurations are possible, such as parallel processors.

The software code/instructions may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media (not signals per se) including program instructions to implement various operations of the above-described examples. The media may also include, alone or in combination with the program instructions, data files, data structures, and the like. The program instructions recorded on the media may be specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The computing apparatuses, the PCIe devices, the electronic devices, the processors, the memories, the displays, the information output system and hardware, the storage devices, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROM, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A networking switch configured to receive a transaction layer packet (TLP) transferred from a host device, wherein a direct memory access (DMA) descriptor packet is encapsulated in the TLP, the networking switch comprising:

a descriptor decoder configured to obtain descriptor data by decoding the DMA descriptor packet encapsulated in the TLP, wherein the networking switch is configured to, based on the obtained descriptor data, identify a link to be passed through to perform a DMA operation indicated in the descriptor data; and a link power controller configured to, in preparation for performance of the DMA operation, adjust, based on the identification of the link to be passed through and based on the obtained descriptor data, a power state of the link to be passed through in a bus interface connected to the networking switch.

2. The networking switch of claim 1, wherein the descriptor decoder is configured to decode the DMA descriptor packet according to a determination that the TLP comprises the DMA descriptor packet.

3. The networking switch of claim 2, wherein the descriptor decoder is configured to determine that the TLP comprises the DMA descriptor packet by decoding a reserved area comprising either a reserved bit included in a header of the TLP or a prefix of the TLP based on a smart data accelerator interface (SDXI) protocol, wherein the reserved area is defined by the host device.

4. The networking switch of claim 2, wherein the descriptor decoder is configured to, based on the determination that the TLP comprises the DMA descriptor packet, decode the DMA descriptor packet as obtained from a data payload of the DMA descriptor packet.

5. The networking switch of claim 1, wherein the descriptor decoder is configured to add information, used to adjust the power state of the link to be passed through, to a reserved area of the DMA descriptor packet as defined by a standard descriptor format of the DMA descriptor packet.

6. The networking switch of claim 1, wherein the descriptor data comprises an amount of data to be transferred according to the DMA descriptor packet, a source address of the data, and/or a destination address of the data.

7. The networking switch of claim 1, wherein the link power controller is configured to adjust the power state of the link to be passed through based on an operation code of the DMA descriptor packet, a size of data transferred through the DMA descriptor packet, a state of a source of the data transferred through the DMA descriptor packet, and/or a state of a destination of the data.

8. The networking switch of claim 1, wherein the link power controller is configured to determine whether to maintain the power state of the link to be passed through in an active state or to switch the power state to a low power state, based on whether the DMA operation is to be performed for a memory device, an amount of data to transferred by the DMA operation, a current power state of the link to be passed through, a power state to be changed of the link to be passed through, or latency for switching the power state of the link to be passed through.

9. The networking switch of claim 8, wherein the link power controller is configured to, in response to the amount of data being smaller than a predetermined reference size, switch the power state of the link to be passed through to the low power state independently of whether the packet comprises the DMA descriptor packet.

10. The networking switch of claim 8, wherein the link power controller is configured to transfer the DMA descriptor packet, which has an indication of an adjusted power state of the link to be passed through, to a DMA engine.

11. The networking switch of claim 10, wherein the link power controller is configured to, in response to the DMA operation for the memory device being performed as the DMA descriptor packet, which has the adjusted power state of the link to be passed through, is transferred to the DMA engine, and an input/output (I/O) device connected to the networking switch being not used for a predetermined period of time, switch the power state of the link connected to the I/O device to the low power state.

12. The networking switch of claim 11, wherein the DMA engine is included in the I/O device or the networking switch.

13. The networking switch of claim 12, wherein the networking switch is configured to, based on the networking switch including the DMA engine and based on recognizing access of the host device to a DMA control register in the networking switch, receive the descriptor data from the host device, and adjust the power state of the link to be passed through to the active state or the low power state by interpreting the descriptor data.

14. The networking switch of claim 1, wherein, based on a number of I/O devices connected to the networking switch being more than one, and the I/O devices performing a DMA operation for a memory device, the host device is configured to maintain the link to be passed through in an active state in a bus interface of a target I/O device to perform the DMA operation among the I/O devices, and transfer the DMA descriptor packet through the link in the active state.

15. The networking switch of claim 1, wherein the link power controller is configured to, based on a number of host devices, including the host device, being more than one and based on a first packet comprising the DMA descriptor packet and a second packet not comprising the DMA descriptor packet being transferred from the host devices:

switch, to an active state, a link to be passed through by the first packet; and switch, to a low power state, a link to be passed through by the second packet.

16. A computer system comprising:

a host device configured to, in response to a DMA request by an application, generate and transfer a transaction layer packet (TLP) encapsulating a direct memory access (DMA) descriptor packet corresponding to a memory device;

a networking switch configured to obtain descriptor data by decoding the DMA descriptor packet encapsulated in the packet, and configured to identify, based on the obtained descriptor data, a link to be passed through to perform a DMA operation indicated in the DMA descriptor data, and configured to, based on the obtained descriptor data and the identification of the link to be passed through, in preparation for performance of the DMA operation, adjust a power state of the link to be passed in a bus interface connected to the networking switch; and an input/output (I/O) device configured to perform the DMA operation for the memory device through the link with the adjusted power state.

17. The computer system of claim 16, wherein a DMA engine configured to perform the DMA operation is included in the I/O device or the networking switch, and whether the networking switch adjusts the power state of the link to be passed through depends on whether the DMA engine performs the DMA operation for the memory device.

18. A method of operating a networking switch, the method comprising:

receiving a transaction layer packet (TLP) from a host device, wherein a direct memory access (DMA) descriptor packet is encapsulated in the TLP;

obtaining descriptor data by decoding the DMA descriptor packet encapsulated in the packet, the descriptor data indicating a DMA operation to be performed for the DMA descriptor packet;

identifying, based on the obtained descriptor data, a link to be passed through to perform the DMA operation indicated in the descriptor data; and in preparation for performance of the DMA operation, based on the descriptor data and the identification of the link to be passed through, adjusting a power state of the link to be passed through in a bus interface connected to the networking switch.

19. The method of claim 18, wherein the power state of the link to be passed through is adjusted based on whether a DMA operation is to be performed for a memory device, an amount of data to be moved by performing the DMA operation, a current power state of the link to be passed through, a power state to be changed of the link to be passed through, and/or latency for switching the power state of the link to be passed through.

20. The method of claim 19, wherein the adjusting of the power state of the link to be passed through comprises, based on the amount of data to be moved by performing the DMA operation for the memory device being smaller than a predetermined reference size, adjusting the power state of the link to be passed through to a low power state independently of whether the packet comprises the DMA descriptor packet.

* * * * *